United States Patent
Pronk et al.

(10) Patent No.: US 7,009,993 B2
(45) Date of Patent: Mar. 7, 2006

(54) CONTENTION RESOLUTION PROTOCOL

(75) Inventors: Serverius Petrus Paulus Pronk, Eindhoven (NL); Ludovicus Marinus Gerardus Maria Tolhuizen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 796 days.

(21) Appl. No.: 10/078,954

(22) Filed: Feb. 19, 2002

(65) Prior Publication Data

US 2002/0114344 A1  Aug. 22, 2002

(30) Foreign Application Priority Data

Feb. 21, 2001  (EP) .................................. 01200621

(51) Int. Cl.
*H04L 12/413* (2006.01)

(52) U.S. Cl. ...................... 370/447; 370/461; 370/462

(58) Field of Classification Search .............. 370/445, 370/447, 458, 461, 462
See application file for complete search history.

(56) References Cited

U.S. PATENT DOCUMENTS

| 4,564,838 | A | * | 1/1986 | Boulogne et al. | ........ 340/825.5 |
| 4,584,678 | A | * | 4/1986 | Ozeki et al. | ................. 370/447 |
| 5,570,347 | A | * | 10/1996 | Bestler et al. | ............. 370/461 |
| 5,615,212 | A | * | 3/1997 | Ruszczyk et al. | ........... 370/433 |
| 5,926,476 | A | * | 7/1999 | Ghaibeh | ................ 370/395.65 |
| 5,956,338 | A | * | 9/1999 | Ghaibeh | .................. 370/236.2 |
| 6,353,617 | B1 | * | 3/2002 | Cadd et al. | ................. 370/445 |
| 6,529,520 | B1 | * | 3/2003 | Lee et al. | .................... 370/442 |
| 6,614,799 | B1 | * | 9/2003 | Gummalla et al. | ......... 370/448 |
| 6,801,537 | B1 | * | 10/2004 | Kubbar | ....................... 370/442 |

OTHER PUBLICATIONS

An Initialisation Protocol for a CDMA based Communications Scheme for HFC CATV Networks, by R.P.C. Wolters et al., IEEE Transactions on Broadcastings, vol. 43, No. 3, Sep. 1997, pp. 329-338.

* cited by examiner

*Primary Examiner*—Min Jung

(57) ABSTRACT

A method for contention resolution in a transmission system (1) is described, the system (1) having a primary station (2) and a plurality of secondary stations (3) coupled to the primary station (2). Sign-On request messages are being sent by the primary station (2) marking starts of contention periods, numbered i=0, 1, 2 . . . , and having period length $P_i$; whereby a number $M_i$ of the secondary stations (3) sends a Sign-On response message to the primary station (2) in contention period i, and, after sending, waits a feedback period of length $T_{fb}$ for a response from the primary station (2). If $N_i$ denotes the number of secondary stations (3) participating at the start of contention period i; an approximation for $M_i$ save for a possible constant factor reads:

$$N_i \cdot P_{i-1}/(P_{i-1}+T_{fb}) \text{ for i=1, 2,} \qquad (1)$$

such that the respective period lengths $P_i$ are determined based on said approximation for $M_i$. An a posteriori estimate of $N_{i-1}$, save for a possible constant factor, is given by:

$$S \ln (S/T_{i-1}^e) \text{ with } S=(T_{fb}+P_{i-1})*R$$

where R is the number of contention slots per time unit, and $T_{i-1}^e$ denotes the number of empty slots in an inspection interval having length $P_i+T_{fb}$ time units.

11 Claims, 1 Drawing Sheet

CONTENTION RESOLUTION PROTOCOL

The present invention relates to a method for contention resolution in a transmission system having a primary station and a plurality of secondary stations coupled to the primary station.

The present invention also relates to a transmission system suitable for applying the method, a primary station suitable for such a transmission system, a secondary station suitable for such a transmission system, and to corresponding signals reflecting the operation of the above method.

Such a method and system are known from an article entitled: 'An Initialisation Protocol for a CDMA based Communications Scheme for HFC CATV Networks', by R. P. C. Wolters et al., IEEE TRANSACTIONS ON BROADCASTING, vol. 43, No. 3, September 1997, pp 329–338. The article describes an initialisation protocol for a Code Division Multiple Access (CDMA) based communication system for Hybrid Fiber Coax (HFC) Community Antenna Television (CATV) networks. High rate modulated downstream communication is performed from a Head End (HE) forming the primary station to a plurality of subscriber Network Terminations (NTs) forming the secondary stations of the transmission system or network. After running through an initialisation or start up process a coded upstream communication takes place from the NTs usually containing modems, such as cable modems, to one or more receivers in the HE. During such a start up process, the modems, which will usually comprise a mixture of synchronously and asynchronously operating modems, will try to get access and make a first contact with the HE, where after if successful, they will go through a process called 'ranging' where they will be identified, synchronised, their time delay be taken account of and their power will be adjusted. A contention resolution protocol is operating in order to resolve possible collisions between modems that simultaneously try to access a same CDMA channel of the communication system. The contention resolution mechanism suggested uses an addressing technique called Medium Access Control (MAC) addressing. After detection of a contention of two or more modems the HE goes through a series of MAC addressing stages, which stages are repeated until only one single modem has responded, after which the ranging procedure of that modem can start. It is a disadvantage of the known contention resolution method, that this addressing technique included therein cannot be implemented in a Digital Video Broadcast (DVB) compliant system.

Therefore it is an object of the present invention to provide a method for time effective contention resolution in a network, as well to provide a transmission system, signals and associated stations for resolving the contention in a Digital Video Broadcast context.

Thereto the method according to the invention is characterised in that Sign-On request messages are being sent by the primary station marking starts of contention periods, numbered i=0, 1, 2 . . . , and having period length $P_i$; that $N_i$ denotes the total number of secondary stations participating at the start of contention period i; that each of a number $M_i$ of the secondary stations sends a Sign-On response message to the primary station, and, after sending, waits a feedback period of length $T_{fb}$ for a response from the primary station; and that save for a possible constant factor an approximation for $M_i$ is given by:

$$N_i \cdot P_{i-1}/(P_{i-1}+T_{fb}) \text{ for } i=1, 2, \ldots \qquad (1)$$

such that the respective period lengths $P_i$ are determined based on said approximation for $M_i$.

It is an advantage of the method according to the present invention that even if the number $M_i$ of secondary stations attempting to sign on is unknown, a practical estimate given by equation (1) for said number can be used to optimise the duration of the period lengths $P_i$ in the sign on procedure, as part of the start up process. Advantageously said number $M_i$ can be used for creating an adaptive sign on procedure, where it is used for adapting the length $P_i$ of a contention period or interval, such that the length $P_i$ could at wish be adapted to the expected possibly varying number of secondary stations actually signing on. This reduces the number of contentions and necessary retransmissions by contending secondary stations, such that the sign on success rate increases and a minimum time gets lost during this phase of the start up of the transmission system. It is noted that the accuracy of the approximation given by equation (1) is greater if the condition is satisfied better, that moments of sending by the secondary stations are nearly homogeneously distributed over the contention periods. Off course in possible embodiments the feedback period $T_{fb}$ could be chosen zero. Analytical results show that a constant factor can be used to multiply the equation (1) with. Such a factor can be used for optimization purposes. The application of the method according to the invention is therewith not restricted to a contention process behavior as arising in a well known ALOHA type channel.

Similarly the invention relates to such a transmission system, a primary station suitable for the transmission system, a secondary station suitable for the transmission system, and to corresponding signals reflecting the operation of the above method.

It is noted that in the paper "Dynamic Frame Length ALOHA", by F. C. Schoute, IEEE Transactions on Communicatins, Vd. COM-31, No. 4, pp. 565–568 and in the paper "Optimal controlled ALOHA for two-way data communication in the cable television network", by R. J. van der Vleuten et. al., IEEE Transactions on Communications, Vol. 42, No. 7, July 1994, pp. 2453–2459 a frame-based ALOHA protocol is disclosed. Due to the lack of synchronization and power calibration among NTs, the contention channel in such a frame-based ALOHA protocol, though still slotted, behaves differently in terms of successes and collisions. Furthermore, this protocol shows a non-negligable contention feedback delay, which complicates the retransmission process.

An embodiment of the method according to the invention is characterised in that for each i=0, 1, 2 . . . , $P_i$ has at least a minimum length $P_{min}$.

Advantageously the minimum length $P_{min}$ assures that the number of sign-on request messages per unit time is bounded.

A further embodiment of the method according to the invention is characterised in that $P_{min}$ is not or not nearly a divisor of the feedback period $T_{fb}$.

Advantageously this condition prevents the creating of a static partitioning, also called stuck-at situation, wherein unsuccessful contending NTs in one period would not be spread out over more than one successive contention periods. In practice, these stuck-at situations will hardly ever happen if $P_{min}$ is not a divisor of $T_{fb}$.

A straight forward embodiment of the method according to the invention is characterised in that the contention period length $P_i$, save for a possible constant factor, is defined as:

$$\max \ [P_{min}, \ N_i * P_{i-1}/(R*(P_{i-1}+T_{fb}))]$$

where R is the number of contention slots per time unit.

Advantageously in this embodiment the varying contention interval length $P_i$ expressed in slots of interval i, where generally i will be larger than 1, may be chosen to correspond to the smallest integer larger than $RP_i$. This ensures an effective contention resolution process. The constant factor again provides possibilities for flexible optimisation.

A still further embodiment of the method according to the invention is characterised in that if the number $N_i$ of participating secondary stations is not known, an a posteriori estimate of the expectation of empty slots within one or more earlier contention periods is used to estimate $N_i$ in equation (1).

It is an advantage of this embodiment that despite the fact that the number $N_i$ of participating secondary stations is not known nevertheless a method is provided which is effectively capable of resolving the contention.

Another very convenient embodiment of the method according to the invention is characterised in that if $T_{i-1}^e$ denotes the number of empty slots in an inspection interval having length $P_i+T_{fb}$ time units, then an a posteriori estimation of the number $N_{i-1}$ of secondary stations that is participating at the start of contention period i−1, save for a possible constant factor, is given by:

$$S \ \ln \ (S/T_{i-1}^e) \text{ with } S=(T_{fb}+P_{i-1})*R \quad (2)$$

where R is the number of contention slots per time unit.

Still another embodiment of the method according to the invention is characterised in that if $T_{i-1}^e=0$, then it may be chosen that the a posteriori estimation of the number $N_{i-1}$ of secondary stations that is participating at the start of contention period i−1 is a multiple A>1 of an earlier estimation, such as the a-posteriori estimation based on the previously inspected interval.

Because of the presence of the 'ln' in the equation (2) above, $T_{i-1}^e=0$ provides problems, because of the division by zero. These problems are at least mitigated by the proposed multiplicative increase of a earlier estimations.

A possible practical choice for the integer A in a particular embodiment is characterised in that A=2.

This notion is suggested by the fact that zero empty slots may indicate a huge number of NT participants, which should be accompanied by an increase in the estimations for $N_{i-1}$, but which should not result in an explosion of the estimation. So A should not be too large. Multiplying by a number larger than 1 causes a linear increase (at least in time) of the estimations. Choosing A only slightly larger than 1 could result in a too slow process. Now depending on the circumstances concerned the man skilled in the art can investigate, find and implement optimum practical values for A.

At present the method and associated system, stations and signals according to the invention will be elucidated further together with their additional advantages, while reference is being made to the appended drawing, wherein similar components are being referred to by means of the same reference numerals. In the drawing.

Figure 1:
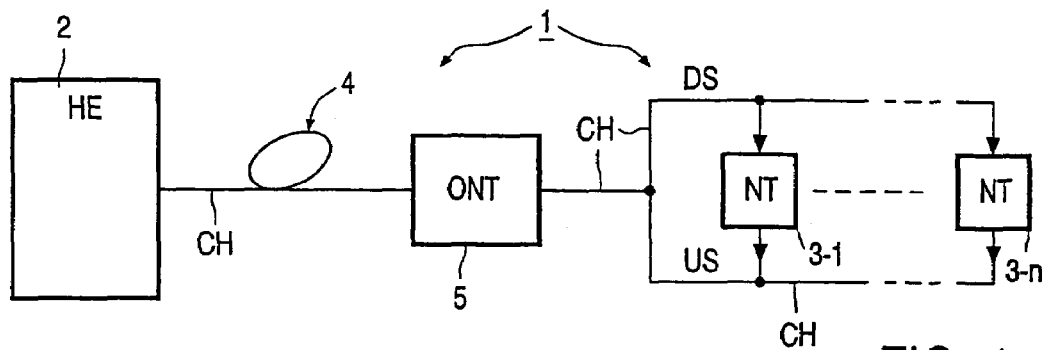
FIG. 1 shows an embodiment of a transmission system, wherein the method according to the invention is implemented.

FIG. 1 shows a transmission system 1 having a primary station 2, also called Head End (HE) and a plurality of secondary stations 3-1, . . . 3-n, also called Network Terminations (NT) which are coupled through a data channel CH to the primary station 2. The system 1 as shown is a HFC/CATV system having a fiber link 4 and an Optical Network Terminator (ONT) 5 by which through a Down Stream (DS) channel and an Up Stream (US) channel, HE 2 and NTs 3, and/or NTs mutually via the HE 2 are capable of communicating over the data channel CH in appropriate time slots.

Just by way of example the system 1 may be a Digital Video Broadcast (DVB)/Digital Audio Video Council (DAVIC)-compliant network with for example N=1000 NTs and an US service channel with a gross capacity of 3,072 Mbit/s. Each frame then consists of 18 slots and lasts 3 ms. Suppose half of the capacity can be used for resolving contentions between NTs wishing to communicate over the US channel, then in this case there are 3 contention slots per frame, i.e. R=1000 contention slots per second. There are specially arranged, so called ranging slots, meant to implement the aforementioned ranging process. In this example these ranging slots occupy three "ordinary" slots. The DS channel may convey high speed data, for example video, and/or television signals.

Figure 2:
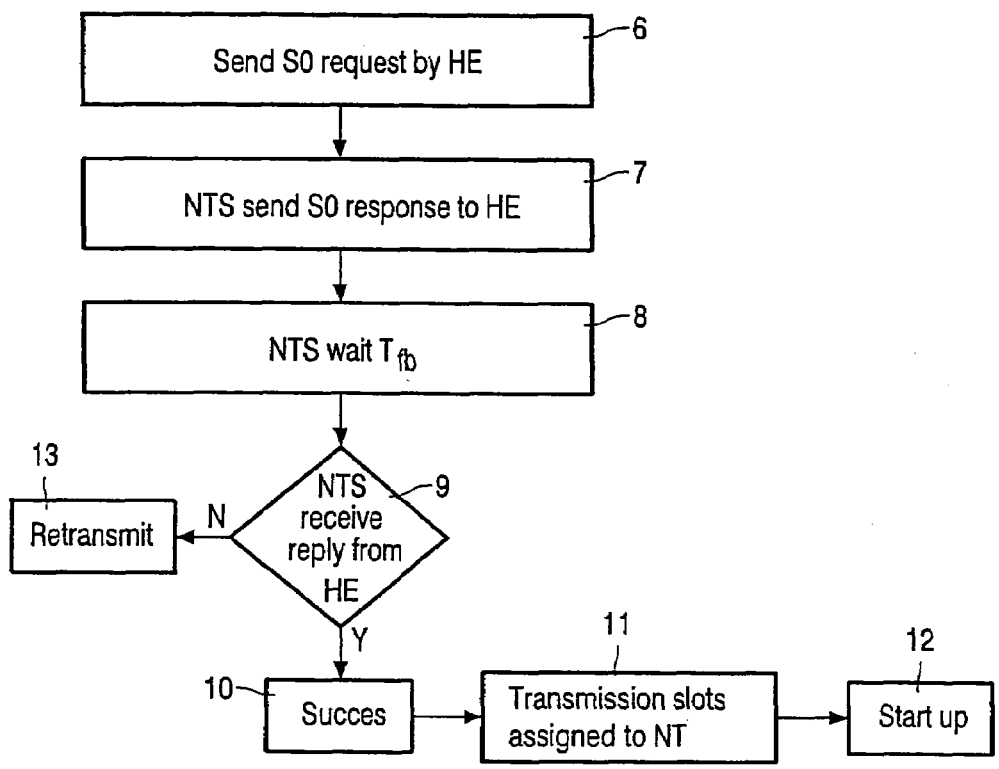
FIG. 2 shows a flow chart for explaining some background of the method according to the invention.
Figure 3:
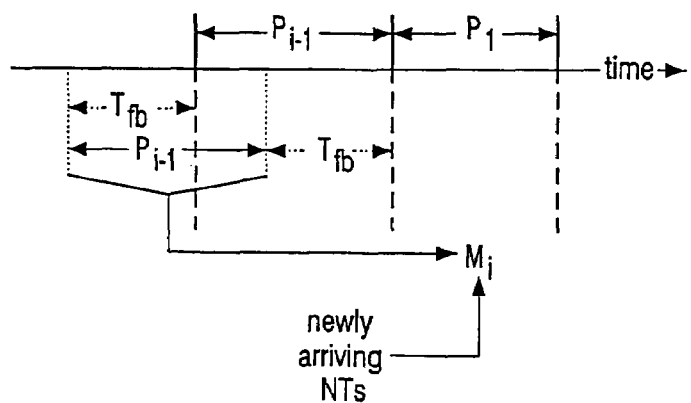
FIG. 3 shows a part of a contention period time graph for explaining the method according to the invention.

FIG. 2 shows a flow chart for explaining some background of a method for the resolution of a contention between two or more secondary stations 3. The explanation is as follows. Usually on a regular basis the primary station, hereafter HE 2, sends a Sign-On (SO) request message —block 6— down stream to all secondary stations, hereafter NTs 3. This marks successive starts of adjacent contention periods, numbered i=0, 1, 2 . . . , each having respective period length $P_i$ (see also FIG. 3). The particular period length $P_i$ is specified in the SO request message. In general a number $M_i$ of the NTs 3 send Sign-On response messages —block 7— which are being received by the HE 2. After sending, the NT 3 waits —block 8— a feedback period indicated $T_{fb}$ for a response from the HE 2. If one or more NTs 3 receive a reply from the HE 2 —block 9— there is success —block 10— in which case those NTs 3 leave the contention phase, and transmission slots are assigned to those NTs 3 —block 11—. These successful NTs 3 can complete their start up —block 12— by for example synchronisation and calibration of their transmission power. In DVB systems other transmission power adjustment processes are possible. Anyway, other NTs 3 that are not successful have to enter the contention phase again and have to go through a retransmit phase —block 13—. Then the previous not successful NT awaits reception of the next Sign On (SO) request message sent by the HE 2, which reception coincides with the start of the next contention period. It may take several attempts before an NT 3 is successful and can leave the contention phase. This may lead to a considerable accumulation of delays due to repeated, unsuccessful attempts, resulting in a long sign-on for the entire system. Also the number $M_i$ of NTs that is sending SO responses in the same contention period i may not be known. This makes it all the more difficult to resolve a situation, wherein too many NTs contend.

If $N_i$ denotes the number of NTs 3 participating at the start of contention period i; then however an approximation for $M_i$— save for a possible constant optimisation factor— can be given by:

$$N_i \cdot P_{i-1}/(P_{i-1}+T_{fb}) \text{ for } i=1, 2, \ldots \quad (1)$$

Suppose in a specific scenario the total number N of participating NTs 3 that start to sign on practically simultaneously, is known, and no additional NT joins thereafter, then $N_i$ can successively be calculated by counting and subtracting the number of successful contenders 3 from said number. By using equation (1) above, as an approximation for the number $M_i$ of sending secondary stations $M_i$, the respective contention interval length $P_i$ can be determined based on the approximation. Suppose R is the number of contention slots per time unit, then $M_i/R$ gives the contention interval length $P_i$. It is noted here that the difference between the numbers $M_i$ and $N_i$ results from NTs being in the so called feedback mode, wherein an NT waits for a response from the HE.

Due to the discrete positioning of contention slots on a time axis, approximate divisibility of $T_{fb}$ by $P_{min}$ suffices to create a static partitioning, resulting in a stuck-at situation, wherein unsuccessful contenders 3 in one period will not be spread over more than one successive contention period. In practice, these stuck-at situations will hardly ever happen if $P_{min}$ is not a divisor of $T_{fb}$. Especially if $N_i$ is estimated as described hereafter, its statistical fluctuations will prevent stuck-at situations.

For each i=0, 1, 2 . . . , the contention period length $P_i$ is now chosen larger than a minimum length $P_{min}$, which minimum length is not taken account of in the above explanation. This minimum length serves to upper bound DS messaging in terms of SO request messages. Generally the contention period length $P_i$, save for a possible constant factor, is defined by:

$$\max [P_{min}, N_i^* P_{i-1}/(R^*(P_{i-1}+T_{fb}))]$$

where as stated above $N_i$ is the number of participating NTs 3 and R is again the number of contention slots per time unit. The necessary calculations can easily be implemented in software and executed on a processor in the head end 2, in order to communicate the period length $P_i$ to all NTs 3.

It might occur that the number $N_i$ of contending secondary stations 3 is not known. This may be caused by a variety of reasons, e.g.: (i) after a start-up, many, maybe not all, NTs go through a sign-on, (ii) after a local power surge an unknown number of NTs may sign on again, (iii) because signing on also has an on-line character: individual NTs may go through sign on for a variety of reasons. The latter results in possible variability of the number $N_i$ of contending secondary stations 3 at all times.

Then an a posteriori estimate of the expectation of empty slots within a contention period i can be used to determine an estimate for $N_i$ in equation (1). The number of newly arriving NTs 3 can sometimes vary considerable such as after an initial turn on of the system 1, or after a reset. In those extreme cases many NTs have to go through the contention phase and they want to do so practically simultaneously. This leads to a congestive very bursty sign on arrival process that can last very long. An a posteriori estimation of the number $N_{i-1}$ of secondary stations that is participating during the period i-1 and during the preceding feedback period $T_{fb}$ (see again FIG. 3), can however be made as follows. In particular if $T_{i-1}^e$ denotes the number of empty slots in the inspected interval $T_{fb}+P_{i-1}$, ending at the start of period i, then the a posteriori estimation of $N_{i-1}$ equals:

$$S \ln (S/T_{i-1}^e) \text{ with } S=(T_{fb}+P_{i-1})^*R.$$

The difficulty at $T_{i-1}^e=0$ can be solved by choosing the a posteriori estimation of $N_{i-1}$ of NTs 3 that are participating at the start of contention period i-1 equal to A times the a posteriori estimation of the number $N_{i-2}$ of NTs 3 that are participating at the start of contention period i-2. In a practical embodiment A is chosen to be the integer number 2.

Whilst the above has been described with reference to essentially preferred embodiments and possible modes it will be understood that these embodiments are by no means to be construed as limiting examples of the method concerned, because various modifications, features and combination of features falling within the scope of the appended claims are now within reach of the skilled person.

What is claimed is:

1. A method for contention resolution in a transmission system (1) having a primary station (2) and a plurality of secondary stations (3-1,3-n) coupled to the primary station (2), characterised in that Sign-On request messages are being sent by the primary station (2) marking starts of contention periods, numbered i =0, 1, 2 . . . , and having period length $P_i$; that $N_i$ denotes the number of secondary stations (3-1, . . . 3-n) participating at the start of contention period i; that each of a number $M_i$ of the secondary stations (3-1, . . . 3-n) sends a Sign-On response message to the primary station (2) in contention period i, and, after sending, waits a feedback period of length $T_{fb}$ for a response from the primary station (2); and that save for a possible constant factor an approximation for $M_i$ is given by:

$$N_i^* P_{i-1}/(P_{i-1}+T_{fb}) \text{ for } i=1, 2, \quad (1)$$

such that the respective period lengths $P_i$ are determined based on said approximation for $M_i$.

2. The method according to claim 1, characterised in that for each i =0, 1, 2 . . . , $P_i$ has at least a minimum length $P_{min}$.

3. The method according to claim 2, characterised in that the minimum length $P_{min}$ is not or not nearly a divisor of the feedback period $T_{fb}$.

4. The method according to claim 3, characterised in that the contention period length $P_i$, save for a possible constant factor, is defined as:

$$\max [P_{min}, N_i^* P_{i-1}/ (R^*(P_{i-1}=T_{fb}))]$$

where R is the number of contention slots per time unit.

5. The method according to claim 1, characterised in that if the number $N_i$ of contending secondary stations (3-1, . . . 3-n) is not known, an a posteriori estimate of the expectation of empty slots within one or more contention periods is used to estimate $N_i$ in equation (1).

6. The method according to claim 5, characterised in that if $T_{i-1}^e$ denotes the number of empty slots in an inspection interval having length $P_i+T_{fb}$ time units, then an a posteriori estimation of the number $N_{i-1}$ of secondary stations (3-1, . . . 3-n) that is participating at the start of contention period i-1, save for a possible constant factor, is given by:

$$S \ln (S/T_{i-1}^e) \text{ with } S=(T_{fb}=P_{i-1})^*R$$

where R is the number of contention slots pertime unit.

7. The method according to claim 6, characterised in that $T_{i-1}^e=0$ then it may be chosen that the a posteriori estimation of the number $N_{i-1}$ of secondary stations (3-1, . . . 3-n) that is participating at the start of contention period i-1 is a multiple A>1 of an earlier estimation, such as the a-posteriori estimation based on the previously inspected interval.

8. The method according to claim 7, characterised in that A=2.

9. A transmission system (1) capable of resolving contention in a network by applying the method according to claim 1, the network having a primary station (2) and a plurality of secondary stations (3-1, ... 3-n) coupled to the primary station (2), characterised in that the primary station (2) is arranged for sending Sign-On request messages marking starts of contention periods, numbered i=0, 1, 2 ..., and having period length $P_i$; that $N_i$ denotes the number of secondary stations (3-1, ... 3-n) participating at the start of contention period i; that each of a number $M_i$ of the secondary stations (3-1, ... 3-n) sends a Sign-On response message to the primary station (2) in contention period i and, after sending, waits a feedback period indicated $T_{fb}$ for a response from the primary station (2); and that save for a possible constant factor an approximation for $M_i$, is given by:

$$N_i * P_{i-1}/(P_{i-1} = T_{fb}) \text{ for } i=1, 2, \quad (1)$$

such that the respective period lengths $P_i$ are determined based on said approximation for $M_i$.

10. A transmission system (1) comprising a primary station (2), the transmission system (1) capable of resolving contention in a network by applying the method according to claim 1, the network including the primary station (2) and a plurality of secondary stations (3-1, ... 3-n) coupled to the primary station (2), characterised in that the primary station (2) is arranged for sending Sign-On request messages marking starts of contention periods, numbered i =0, 1, 2 ..., and having period length $P_i$; that $N_i$ denotes the number of secondary stations (3-1, ... 3-n) participating at the start of contention period i; that each of a number $M_i$ of the secondary stations (3-1, ... 3-n) sends a Sign-On response message to the primary station (2) in contention period i and, after sending, waits a feedback period indicated $T_{fb}$ for a response from the primary station (2); and that save for a possible constant factor an approximation for $M_i$ is given by:

$$N_i * P_{i-1}/(P_{i-1} = T_{fb}) \text{ for } i=1, 2, \quad (1)$$

such that the respective period lengths $P_i$ are determined based on said approximation for $M_i$.

11. A transmission system (1) comprising a secondary station (3-1, ... 3-n), the transmission system (1) capable of resolving contention in a network by applying the method according to claim 1, the network including a primary station (2) and a plurality of the secondary stations (3-1, ... 3-n) coupled to the primary station (2). characterised in that the primary station (2) is arranged for sending Sign-On request messages marking starts of contention periods, numbered i=0, 1, 2 ..., and having period length $P_i$; that $Ni$ denotes the number of secondary stations (3-1, ... 3-n) participating at the start of contention period i; that each of a number $M_i$ of the secondary stations (3-1, ... 3-n) sends a Sign-On response message to the primary station (2) in contention period i and, after sending, waits a feedback period indicated $T_{fb}$ for a response from the primary station (2); and that save for a possible constant factor an approximation for $M_i$ is given by:

$$N_i * P_{i-1}/(P_{i-1} + T_{fb}) \text{ for } i=1, 2, \quad (1)$$

such that the respective period lengths $P_i$ are determined based on said approximation for $M_i$.

* * * * *